US012616162B1

(12) United States Patent
Casebeer

(10) Patent No.: US 12,616,162 B1
(45) Date of Patent: May 5, 2026

(54) BEDDING MATERIAL SEPARATOR

(71) Applicant: Tyler Casebeer, White City, OR (US)

(72) Inventor: Tyler Casebeer, White City, OR (US)

( * ) Notice: Subject to any disclaimer, the term of this patent is extended or adjusted under 35 U.S.C. 154(b) by 0 days.

(21) Appl. No.: 19/174,456

(22) Filed: Apr. 9, 2025

(51) Int. Cl.
| | |
|---|---|
| *A01K 1/01* | (2006.01) |
| *B07B 1/00* | (2006.01) |
| *B07B 1/12* | (2006.01) |
| *B07B 1/30* | (2006.01) |

(52) U.S. Cl.
CPC .............. *A01K 1/01* (2013.01); *B07B 1/005* (2013.01); *B07B 1/12* (2013.01); *B07B 1/30* (2013.01)

(58) Field of Classification Search
CPC ........ A01K 1/01; A01K 1/015; A01K 1/0114; A01K 1/0117; A01K 1/0112; A01K 1/0116; B07B 1/005; B07B 1/12; B07B 1/30; B07B 1/34; B07B 1/40; B07B 1/42; B07B 11/08
See application file for complete search history.

(56) References Cited

U.S. PATENT DOCUMENTS

| | | | | |
|---|---|---|---|---|
| 1,230,477 A * | 6/1917 | Green | .................... | B07B 1/46 |
| | | | | 209/365.2 |
| 1,773,405 A * | 8/1930 | Overstrom | .............. | B07B 1/284 |
| | | | | 74/61 |
| 2,295,461 A * | 9/1942 | Federwitz | .............. | B31B 70/00 |
| | | | | 493/417 |
| 3,307,698 A * | 3/1967 | Haffner | .................. | B07B 1/005 |
| | | | | 209/420 |
| 5,335,784 A * | 8/1994 | Tyler | .................... | B07B 1/46 |
| | | | | 209/420 |
| 5,927,513 A * | 7/1999 | Hart | .................... | A01K 1/0146 |
| | | | | 209/325 |
| 6,334,538 B1 * | 1/2002 | Nettles | .................... | B07B 1/40 |
| | | | | 209/418 |
| 7,306,104 B2 * | 12/2007 | Zeller | .................... | B07B 1/005 |
| | | | | 209/420 |
| 8,393,040 B2 * | 3/2013 | Linsmeier | ................ | B08B 9/08 |
| | | | | 15/93.1 |
| 9,358,583 B1 * | 6/2016 | Kahn | .................... | B07B 1/282 |
| 2003/0150781 A1 * | 8/2003 | Forrest | .................. | A01K 1/015 |
| | | | | 209/420 |

FOREIGN PATENT DOCUMENTS

| | | | | | |
|---|---|---|---|---|---|
| AU | 2019203396 A1 * | 5/2020 | .......... | A01D 43/086 |
| CA | 2764128 A1 * | 7/2013 | .............. | A01K 1/01 |
| GB | 191104794 A * | 10/1911 | ............ | B07B 1/005 |

\* cited by examiner

*Primary Examiner* — Ebony E Evans

(74) *Attorney, Agent, or Firm* — Renner, Otto, Boisselle & Sklar, LLP

(57) ABSTRACT

A separator device is provided for sifting soiled animal bedding including a separator frame having a stand and at least one wheel. The stand engages and disengages with a floor to move from a stationary position to an ambulatory position. The separator device includes a flexible member and a screen attached to the flexible member for supporting the soiled animal bedding. An actuator is attached to the screen and applies an oscillatory force to the screen. The oscillatory force causes the screen to oscillate to sift soiled animal bedding as the animal bedding is moved along the separator frame. Reusable animal bedding material falls through the screen while clumped animal manure moves toward the front of the separator frame. A container supported by the separator frame collects clumped animal manure falling off of the front edge of the screen.

20 Claims, 13 Drawing Sheets

1200

1210

Operating the actuator to urge the screen to oscillate to sift the animal bedding material through the screen while moving clumped animal manure in a direction toward the front of the separator frame

1220

Placing a quantity of the soiled animal bedding onto a screen of a separator device

BEDDING MATERIAL SEPARATOR

TECHNICAL FIELD

The present disclosure relates to separator devices and methods for sifting soiled animal bedding and more particularly to separator devices and methods configured to oscillate a screen at particular frequencies and displacement distances at relatively low volume levels.

BACKGROUND

Cleaning and mucking animal stalls presents several challenges to workers, including repetitive motion injuries, excessive time requirements, and the inconvenience of having to remove boarded animals from stalls during cleaning procedures. Workers are frequently required to separate clumped animal manure from stall bedding materials to both thoroughly clean the stall and to reclaim any bedding suitable for reuse. Typically, this task involves the use of a pitchfork or similar manual tools to lift soiled bedding from the stall floor, followed by manually sifting or employing mechanical sifting devices to separate manure from reusable bedding. Such manual tasks are labor-intensive, inefficient, and can lead to repetitive strain injuries over time. Additionally, many existing mechanical sifting devices are relatively bulky and produce considerable noise, which often necessitates temporarily relocating animals from their stalls, thus adding to worker inconvenience and increasing overall time spent on stall maintenance.

SUMMARY

Although bedding sifting devices provide some assistance to workers cleaning animal stalls, one problem that workers face is that sifting devices can be relatively large and difficult to maneuver inside and outside of an animal stall. Additionally, many sifting devices are relatively loud, resulting in a perceived need to remove the animal from the stall during the cleaning operation. Additionally, some devices also lack a clumped animal manure receptacle attached to the device. As a result, workers may require many trips into and out of the stall to be cleaned in addition to the numerous repetitive motions of using a pitchfork to move or sift the soiled animal bedding, potentially increasing a likelihood of injury to worker cleaning the stall.

Generally, the animal bedding material separator oscillates a screen at a relatively high frequency and relatively low volume to increase the efficiency of the device and to eliminate the need to remove the animal from the stall during a cleaning operation. The device can also improve the efficiency of the separation, or sifting, of the soiled animal bedding to reduce the amount of animal bedding material placed in the stall over time. Components of the separator are mounted to a relatively small, wheeled frame to promote ease of maneuverability inside and outside of the stall.

More particularly, according to an aspect of the present disclosure, a separator device for sifting soiled animal bedding to separate animal bedding material from clumped animal manure includes a separator frame. The separator frame includes handles attached to the separator frame that are located at a back of the separator frame. The separator device also includes at least one wheel rotationally attached to the separator frame and a stand attached to the separator frame. The stand is configured to engage with a floor when the separator frame is in a stationary position such that the separator frame is positioned in an upright position when at rest. The stand is also configured to disengage with the floor when the separator frame is moved from the stationary position to an ambulatory position by applying a lifting force to the handles acting in a direction perpendicular to the floor. The lifting force is applied such that the separator device is movably supported by the at least one wheel. The separator device further includes a flexible member attached to the separator frame. The separator device still further includes a screen attached to the flexible member, the screen is configured to support the soiled animal bedding. The separator device also includes an actuator mechanically attached to the screen. The actuator is configured to apply an oscillatory force to the screen. The screen is mechanically supported by the flexible member such that the screen lies along a plane extending from the back of the separator frame towards a front of the separator frame. The screen is mechanically supported by the flexible member such that the oscillatory force applied to the screen by the motor causes the screen to oscillate relative to the separator frame. The oscillation of the screen sifts the supported soiled animal bedding, such that the supported animal bedding is moved along a direction from the back of the separator frame towards the front of the separator frame. During the movement of the supported animal bedding, the animal bedding material falls through the screen while the clumped animal manure moves towards the front of the separator frame until the clumped animal manure falls off a front edge of the screen. The separator device further includes a container supportable by a container support of the separator frame such that the clumped animal manure falling off of the front edge of the screen is collected by the container when the container is supported by the container support. The separator frame additionally includes the container support and the container support is configured to mechanically support the container.

According to another aspect of the present disclosure, a separator device for sifting soiled animal bedding to separate animal bedding material from clumped animal manure, includes a separator frame. The separator frame includes handles attached to the separator frame located at a back of the separator frame. The separator device also includes at least one wheel rotationally attached to the separator frame and a stand attached to the separator frame. The stand is configured to engage with a floor when the separator frame is in a stationary position such that the separator frame is positioned in an upright position when at rest. The stand is also configured to disengage with the floor when the separator frame is moved from the stationary position to an ambulatory position. The separator frame is moved from the stationary position to the ambulatory position by applying a lifting force to the handles acting in a direction perpendicular to the floor. When in the ambulatory position, the separator device is movably supported by the at least one wheel. The separator device further includes a flexible member attached to the separator frame. The separator device still further includes a screen attached to the flexible member such that the screen is configured to support the soiled animal bedding. The separator device also includes a sidewall attached to the separator frame to at least partially define a hopper volume above the screen to contain a quantity of the soiled animal bedding and the clumped animal manure. The separator device further includes an actuator mechanically attached to the screen. The actuator includes an eccentric weight attached to a rotating shaft of the actuator to apply an oscillatory force to the screen. The separator device still further includes a battery attached to the separator frame and in electrical communication with the actuator to provide electrical power to the actuator. The separator device also includes a speed control device in electrical communication with the actuator to selectively control a rotational rate of the actuator to control an oscillation speed of the screen. The screen is mechanically supported by the flexible member such that the screen lies along a plane extending from the back of the separator frame towards a front of the separator frame. The screen is mechanically supported by the flexible member such that the oscillatory force applied to the screen by the motor causes the screen to oscillate relative to the separator frame. The oscillation of the screen sifts the supported soiled animal bedding such that the supported animal bedding is moved along a direction from the back of the separator frame towards the front of the separator frame. The oscillation of the screen sifts the supported soiled animal bedding such that during the movement of the supported animal bedding, the animal bedding material falls through the screen while the clumped animal manure moves towards the front of the separator frame until the clumped animal manure falls off a front edge of the screen. The separator device further includes a container supportable by a container support of the separator frame. The container is supportable such that the clumped animal manure falling off of the front edge of the screen is collected by the container when the container is supported by the container support. The separator frame additionally includes the container support and the container support is configured to mechanically support the container.

According to another aspect of the present disclosure, a method of operating a separator device for sifting soiled animal bedding to separate animal bedding material from clumped animal manure includes placing a quantity of the soiled animal bedding onto a screen of a separator device. The separator device includes a separator frame including handles attached to the separator frame located at a back of the separator frame. The separator device also includes at least one wheel rotationally attached to the separator frame. The separator device further includes a stand attached to the separator frame and a flexible member attached to the separator frame. The separator device still further includes a screen attached to the flexible member that is configured to support the soiled animal bedding. The separator device also includes an actuator mechanically attached to the screen that is configured to apply an oscillatory force to the screen. The separator device further includes a container supportable by a container support of the separator frame such that the clumped animal manure falling off of a front edge of the screen is collected by the container when the container is supported by the container support. The method also includes operating the actuator to urge the screen to oscillate to sift the animal bedding material through the screen while moving clumped animal manure in a direction toward the front of the separator frame to separate the animal bedding material from the clumped animal manure.

The following description and the annexed drawings set forth certain illustrative embodiments of the disclosure. These embodiments are indicative, however, of but a few of the various ways in which the principles of the disclosure may be employed. Other objects, advantages and novel features according to aspects of the disclosure will become apparent from the following detailed description when considered in conjunction with the drawings.

BRIEF DESCRIPTION OF THE DRAWINGS

The annexed drawings, which are not necessarily to scale, show various aspects of the audible information device and its use.

DETAILED DESCRIPTION

Figure 1:
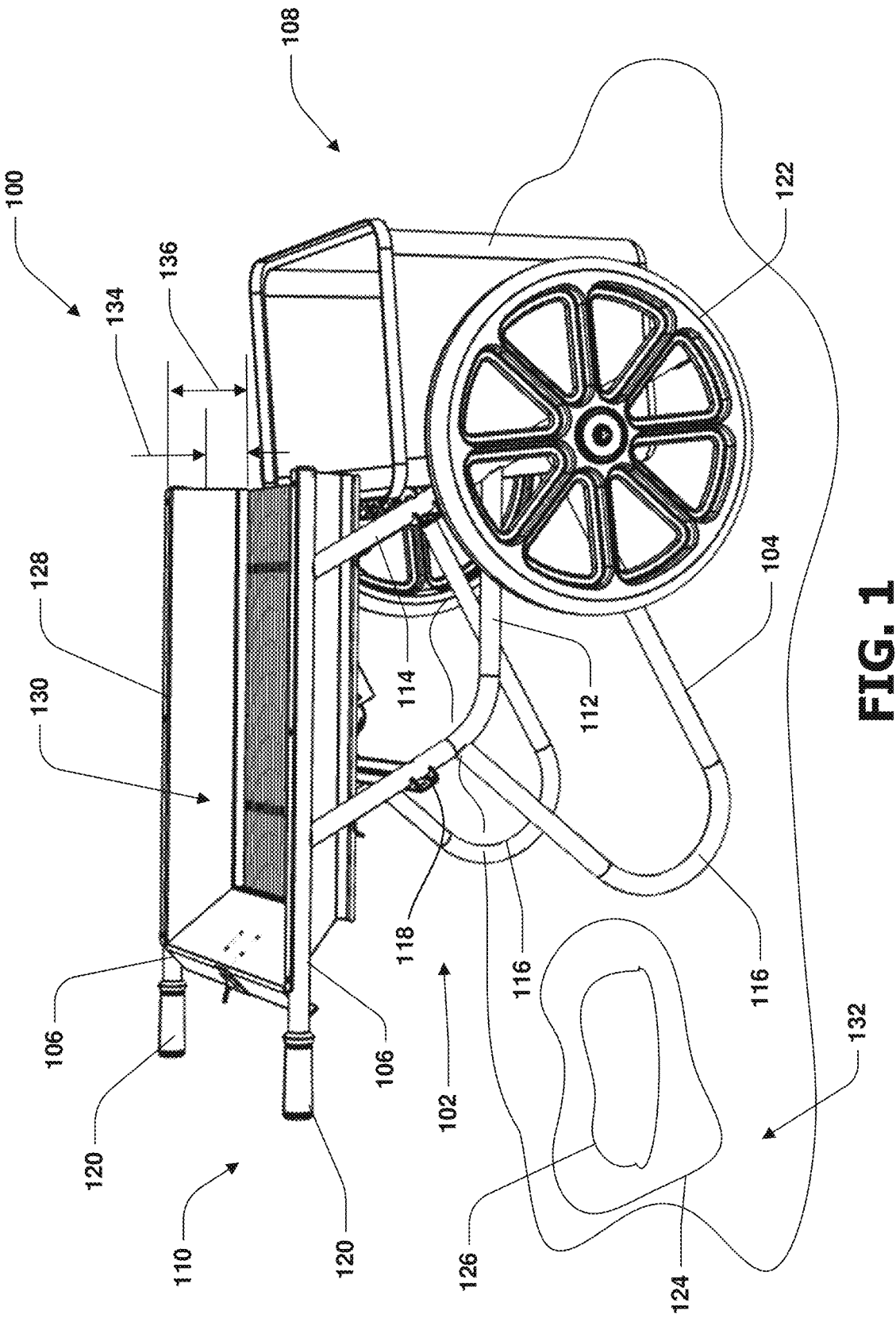
FIG. 1 is a perspective view of an embodiment of the disclosed separator device on a floor surface having a quantity of soiled animal bedding material.

While the described apparatus and methods can take many different forms, for the purpose of promoting an understanding of the principles of the disclosure, reference will now be made to the embodiments illustrated in the drawings and specific language will be used to describe the same. It will nevertheless be understood that no limitation of the scope of the disclosure is thereby intended.

Generally, the present disclosure is directed to an apparatus and methods that provide several benefits to workers tasked with cleaning or mucking animal stalls. The term animal can include any number of various animal species including, but not limited to, horses. Generally, the floors of animal stalls can be covered with animal bedding material, and as the animal excretes waste, the waste can form clumps within the animal bedding material, becoming soiled bedding material. From time to time, it is desirable to remove the clumped animal waste from the animal stall to promote animal health, reduce noxious odors, reduce the prevalence of flies, etc. Often, human workers are tasked with sifting the soiled bedding material to separate the clumped animal waste from a quantity of bedding material that can be reused.

Referring initially to FIG. 1, a perspective view of an exemplary embodiment of a separator device 100 is illustrated. The separator device 100 includes a separator frame 102 providing relatively rigid support for various components of the separator device 100. In some examples, the separator frame 102 can be constructed of metallic hollow tubing 104, however, any suitable material can be used. The separator frame 102 can be engineered and constructed to withstand typical stress and strain demands during a desired life expectancy for the separator device 100. In some examples, the separator frame 102 is constructed of several pieces, and any suitable arrangement for the several pieces can be utilized.

As shown, the separator frame 102 includes upper horizontal members 106 extending from a front 108 of the separator frame 102 to a back 110 of the separator frame 102. The separator frame 102 can also include a rear vertical member 112 extending generally downward from the upper horizontal members 106 and toward the front 108 of the separator frame 102 on each side of the separator device 100. The separator frame 102 can further include a front vertical member 114 extending generally downward from the upper horizontal members 106 on each side of the separator device 100. The separator frame 102 can still further include a lower frame member 116 to act as a stand attached to the separator frame 102, however, a stand is not required to be integral with the separator frame 102. In some examples, the separator frame 102 includes a cross brace 118 that extends between two rear vertical members 112. Another cross brace 118 can extend between two front vertical members 114. A pair of handles 120 are attached to the separator frame 102 and are located at the back 110 of the separator frame 102. For example, handle 120 can be attached to each of the upper horizontal members 106.

The separator device 100 also includes at least one wheel 122 rotationally attached to the separator frame 102. As shown, the separator device 100 can include more than one wheel 122, which can provide particular benefits to the separator device 100 such as increased stability. The wheel 122 can also provide relative ease of maneuverability of the separator device 100 when moving the separator device 100. In some examples, the wheel 122 can reduce an amount of effort to move the separator device 100 over a quantity of animal bedding material 124 and clumped animal manure 126 that may at least partially cover a floor of an animal stall.

The separator frame 102 can also include a sidewall 128 to at least partially define a hopper volume 130 to contain a quantity of the soiled animal bedding and the clumped animal manure 126 prior to separation of the clumped animal manure 126 from the animal bedding 124.

In some examples, the sidewall 128 is oriented at an angle relative to a direction perpendicular to the floor 132 such that the hopper volume 130 has a first cross-sectional area at a first distance 134 above a sifting screen and a second cross-sectional area at a second distance 136 above the sifting screen. The first cross-sectional area is greater than the second cross-sectional area.

Figure 2:
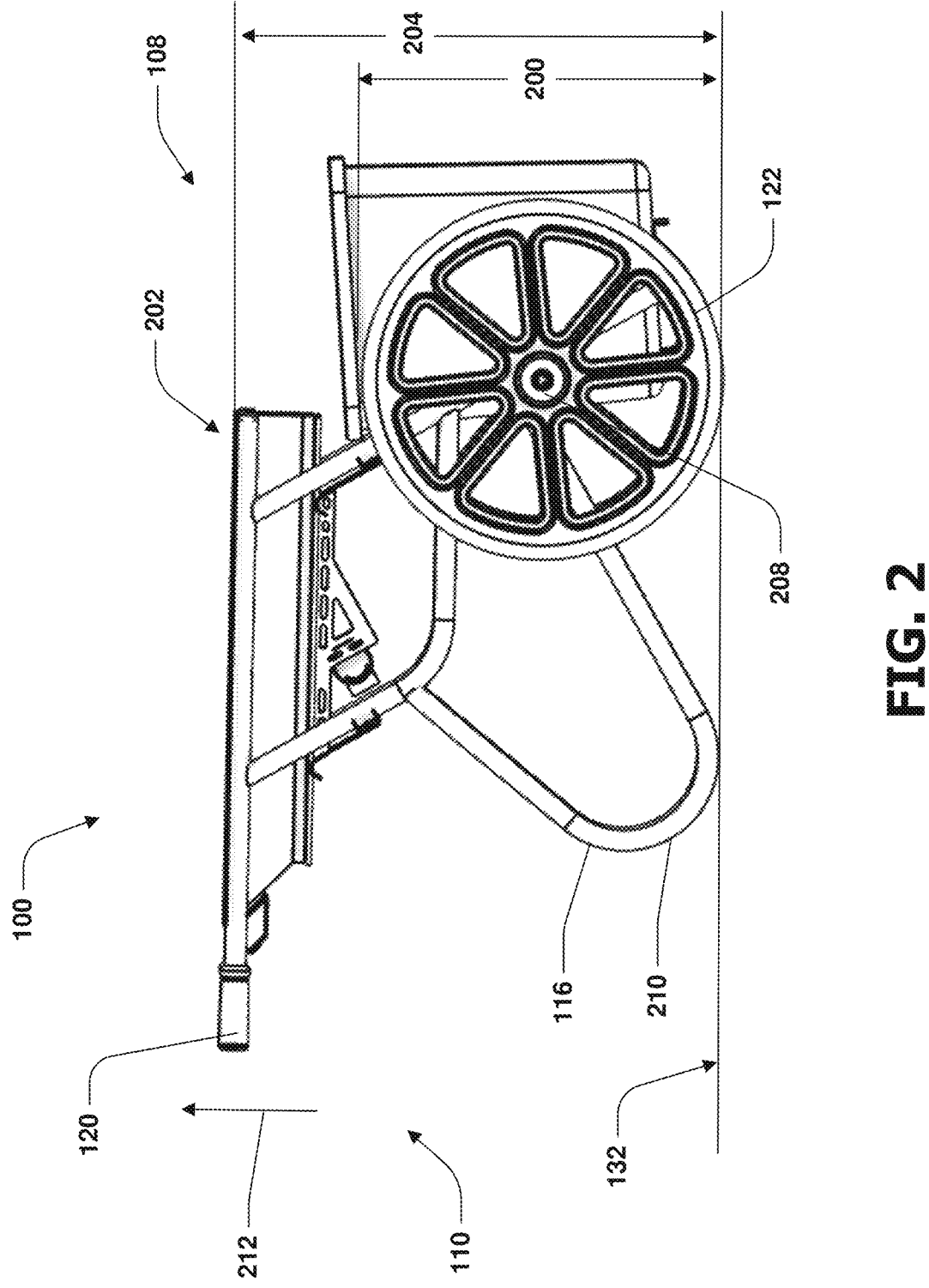
FIG. 2 is an elevation view of the separator device of FIG. 1 in a stationary position.

Referring to FIG. 2, a side elevation view of the separator device 100 is illustrated. As previously discussed, the at least one wheel 122 can reduce an amount of effort needed to move the separator device 100. In some examples, particular ratios of an outside diameter 200 of the wheel 122 to the total height of the separator device 100 can be calculated to further reduce the amount of effort needed to move the separator device 100. In some examples, the length of the outside diameter 200 of the wheel 122 is about 65% to about 95% of the distance 204 measured from a top 202 of the separator frame 102 to the floor 206. In further examples, the length of the outside diameter 200 of the wheel 122 is about 70% to about 90% of the distance 204 measured from a top 202 of the separator frame 102 to the floor 206. In still further examples, the length of the outside diameter 200 of the wheel 122 is about 75% to about 85% of the distance 204 measured from a top 202 of the separator frame 102 to the floor 206.

The wheel 122 can be attached to the separator frame 102 using any suitable structures and methods. For example, a hub 208 of the wheel 122 can be attached to the separator frame 102 using an axle (not shown) that can extend through the separator frame 102 to another wheel 122. In other examples, each individual wheel 122 can be rotatingly attached to the separator frame 102 separately, without a common axle.

The handle 120 is attached to the back 110 of the separator frame 102 such that a generally upward force (represented by arrow 212) on the handle 120 urges rotation of the separator frame 102 about an axis passing through the hub 208. In this configuration, the hub 108 acts as a fulcrum of a lever.

Whether integral with the separator frame 102 or constructed as an individual part, the previously discussed stand 210 is attached to the separator frame 102. The stand 210 is configured to engage with the floor 206 when the separator frame 102 is in a stationary position (as shown in FIG. 2), such that the separator frame 102 is positioned in an upright position when the separator device 100 is at rest.

Figure 3:
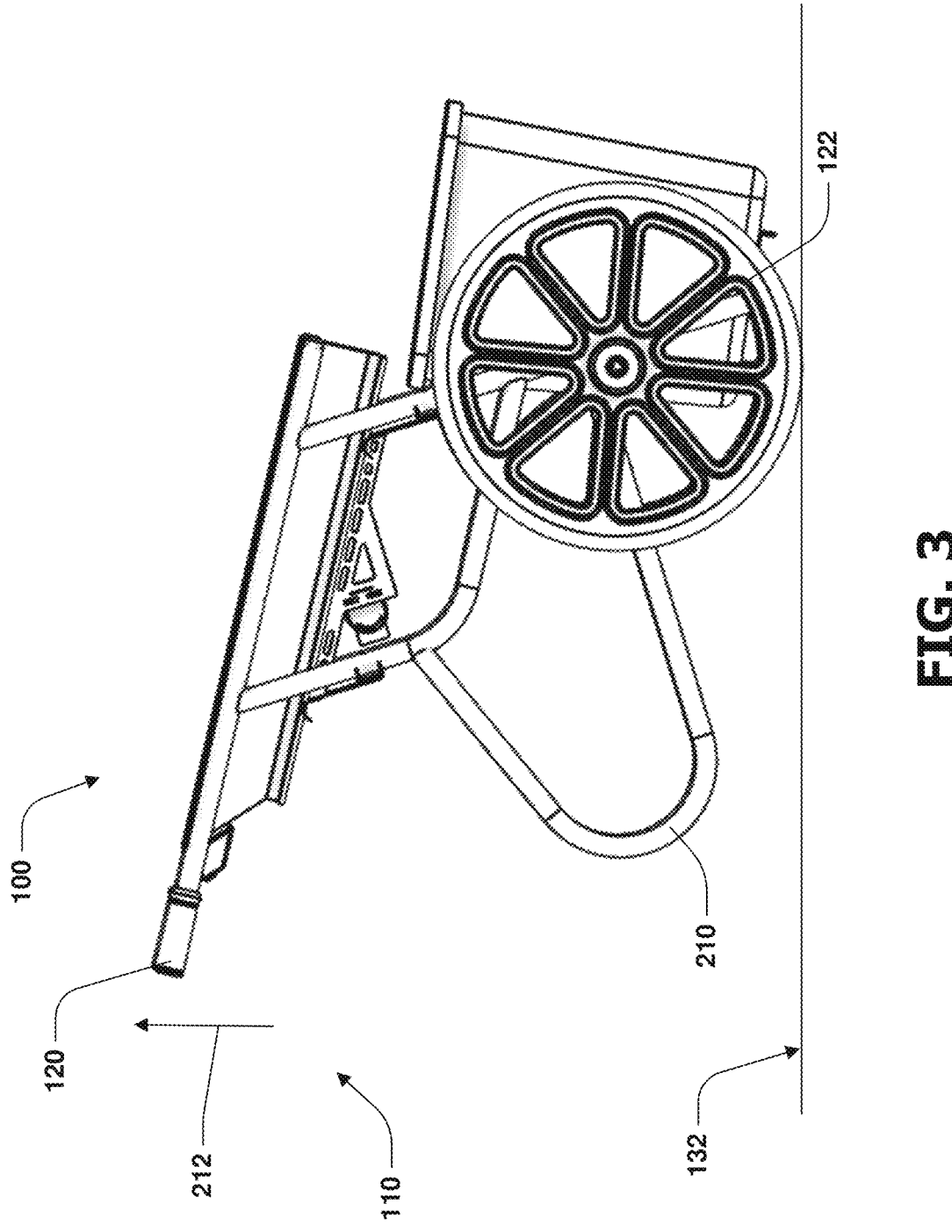
FIG. 3 is similar to FIG. 2 showing the separator device in an ambulatory position.

Referring to FIG. 3, an elevation view of the separator device 100 in an ambulatory position is illustrated. The stand 210 is configured to disengage with the floor 206 when the separator frame 102 is moved from the stationary position (as shown in FIG. 2) to the ambulatory position of FIG. 3 by applying a lifting force 212 to the handles 120 acting in a direction perpendicular to the floor 206. In other words, an upward force 212 is applied to the handles 120 to transition the separator device 100 from the stationary position of FIG. 2 to the ambulatory position of FIG. 3. When in the ambulatory position, the separator device 100 is movably supported by the at least one wheel 122. While the separator device has been illustrated thus far as having two wheels 122 and two stands 210, any suitable combination of quantities of both the wheels 122 and the stands 210 may be used.

In the shown example, the stand 210 is located between the at least one wheel 122 and the back 110 of the separator frame 102. The shown arrangement is similar to a wheelbarrow arrangement enabling a worker to lift up the back 110 of the separator device 100 using the lever arrangement described to rotate the separator device 100 about the axle of the at least one wheel 122. This arrangement enables a worker to lift only a fraction of the weight of the separator device 100 and enjoy a relatively low coefficient of rolling friction between the wheel 122 and the floor 206 as the worker moves the separator device 100 between locations.

Figure 4:
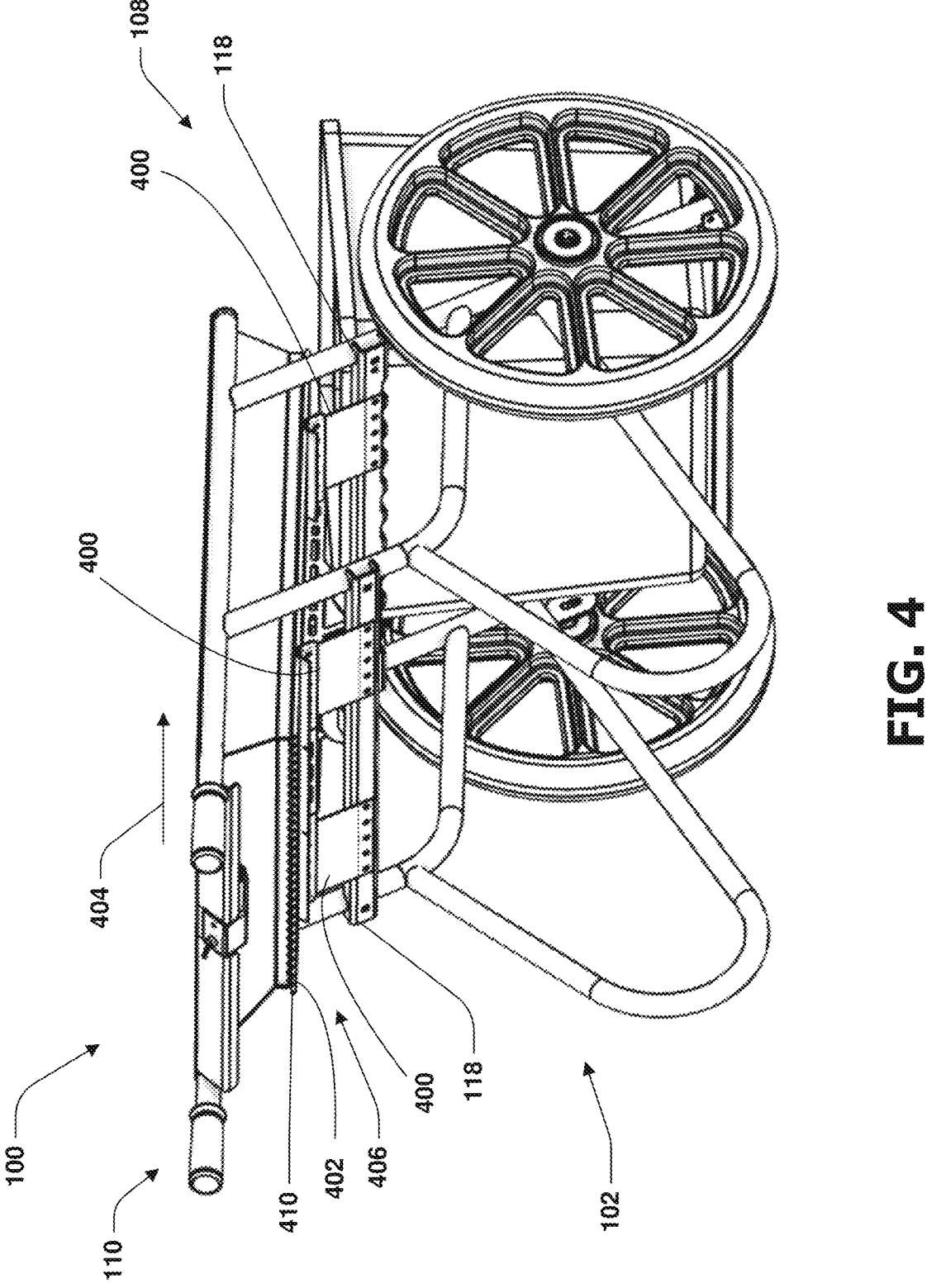
FIG. 4 is a perspective view of the separator device of FIG. 1 shown from a back, underside of the separator device.
Figure 5:
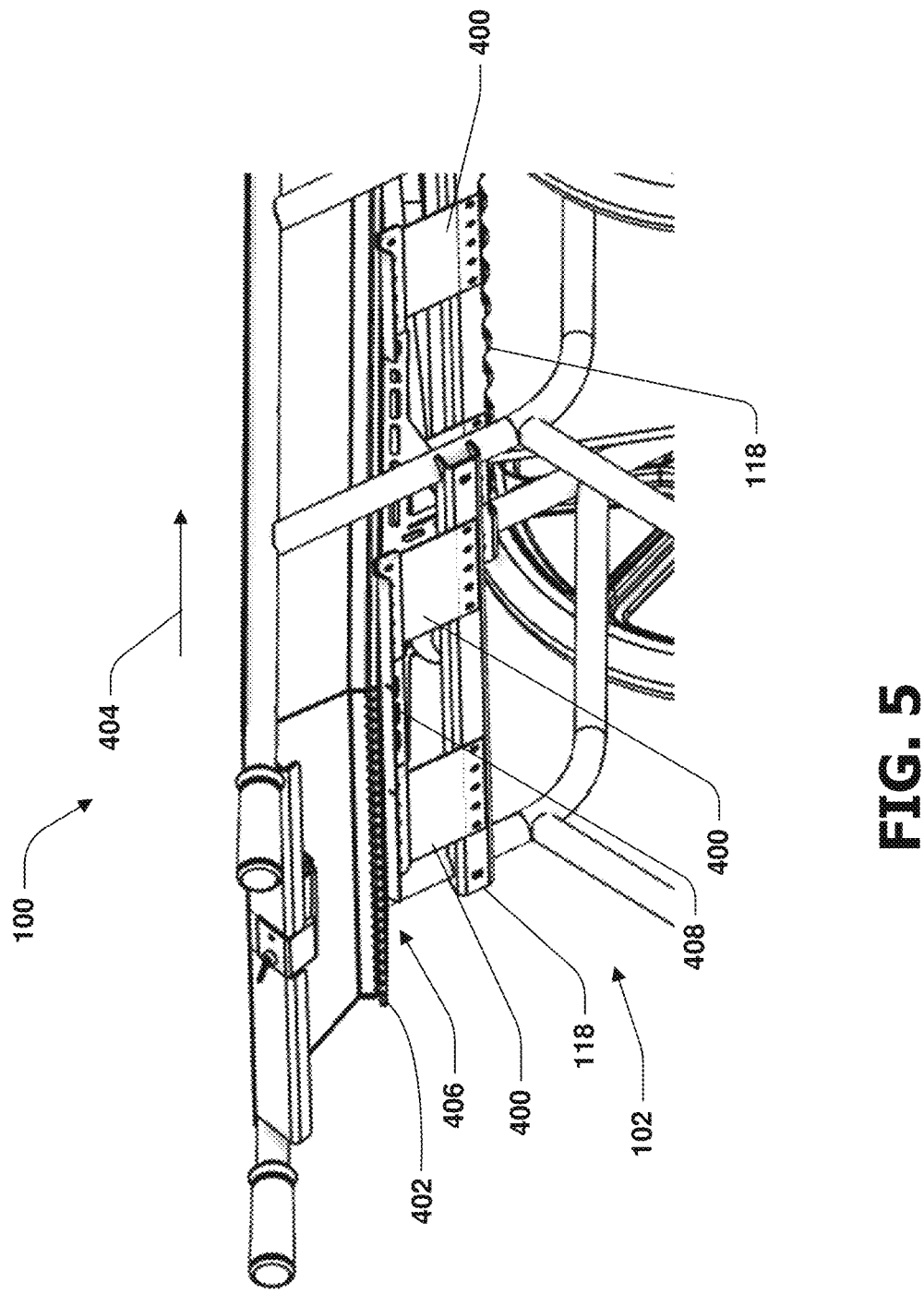
FIG. 5 is a detail view of the separator device of FIG. 4.
Figure 6:
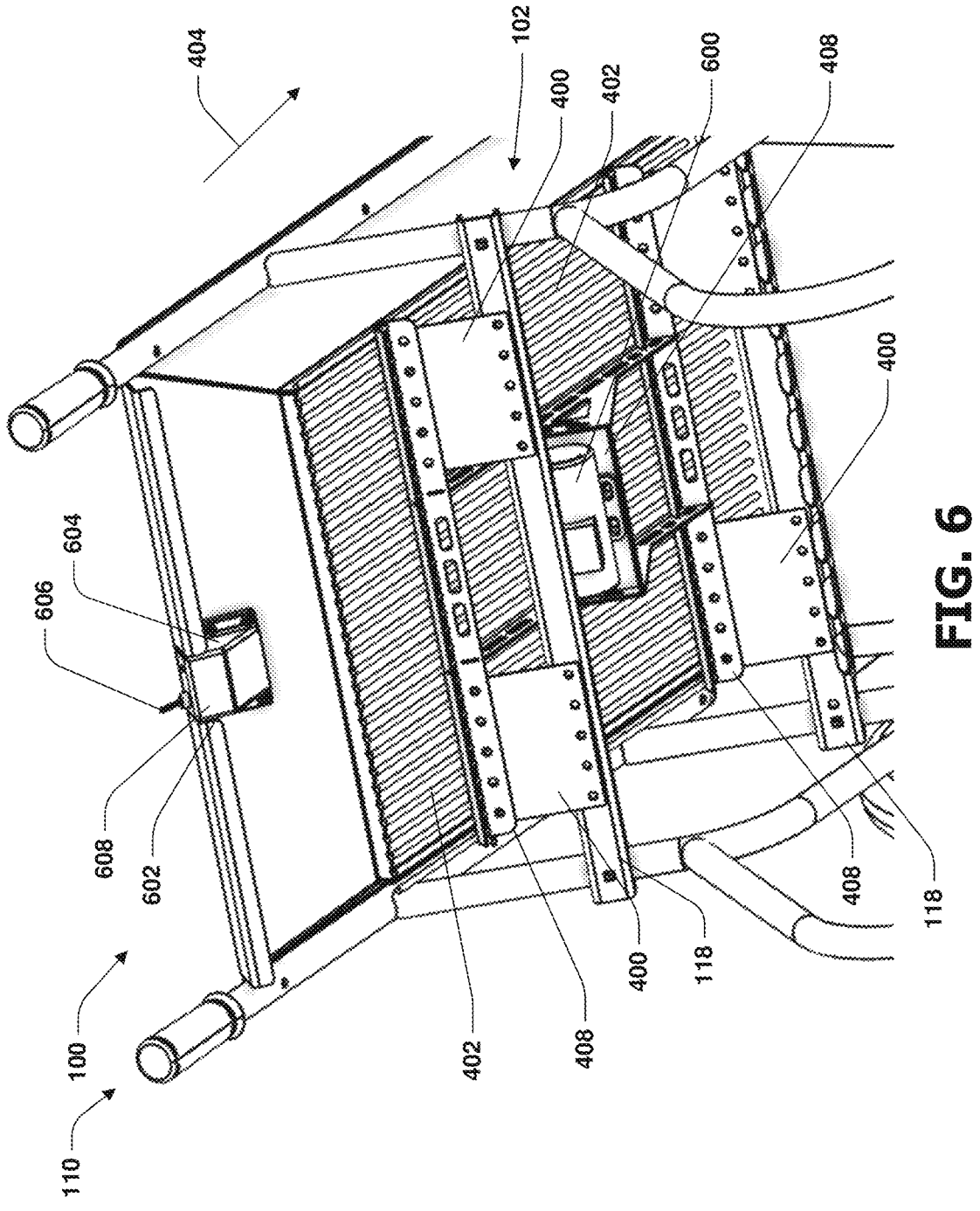
FIG. 6 is a perspective view of the separator device of FIG. 1 shown from a front of the separator device.

Referring to FIGS. 4, 5, and 6, perspective views of the separator device 100 are shown from a back, right side of the separator device 100 (FIGS. 4 and 5) and an underside of the separator device 100 (FIG. 6). A flexible member 400 is attached to a portion of the separator frame 102. As shown, the flexible member 400 can be attached to the cross bar 118 portion of the separator frame 102. Any suitable number of flexible members 400 can be attached to the separator frame 102 to suit desired sifting characteristics of the separator device 100. The flexible members 400 can be attached to the cross bar 118 with fasteners such as bolts, however, any suitable attachment structures and methods can be used.

A screen 402 is attached to, or mechanically supported by, the flexible member 400, and the screen 402 is configured to support the soiled animal bedding. Any suitable screen material can be used to construct the screen 402. For example, the screen material can include, but is not limited to, perforated metal sheets, woven wire (e.g., metallic screen), woven non-metallic strands, metal rods, combinations of these materials, etc. In some examples, the interstitial spaces between the screen members can measure between 0.2 inches and 0.5 inches. In some examples, the interstitial spaces can measure between 0.28 inches and 0.4 inches. In some examples, the interstitial spaces can measure 0.34 inches. Selection of the interstitial space distances can depend upon an animal breed within the stall, an average size of the shavings that constitute the animal bedding 104, etc.

In some examples, the screen 402 includes rods extending in a direction parallel with a direction (represented by arrow 404) extending from the back 110 of the separator frame 102 to the front 108 of the separator frame 102. In some examples, the rods are positioned with an open space between each rod of about 0.4 inches. In some examples, the rods are positioned with an open space (e.g., an interstitial space) between each rod of about 0.34 inches. In further examples, the rods are positioned with an open space between each rod of about 0.28 inches.

While not required, some examples can include a screen assembly 406 to provide a support for several additional components that will be described below. The screen assembly 406 can include a screen frame 408 that provides a relatively rigid mounting structure for the screen 402. The screen frame 408 can consist of several portions including some portions that are not contiguous or attached directly to other portions of the screen frame 408.

As shown in FIGS. 4, 5, and 6, the flexible member 400 can be attached to a portion of the screen frame 408. In some examples, the flexible member 400 can be attached directly to the screen 402. Regardless of the attachment structure or method, the screen 402 is mechanically supported by the flexible member 400. Location of the flexible member 400 between the separator frame 102 and the screen 402 enables a limited amount of relative motion between the separator frame 102 and the screen 402.

Additionally, the screen 402 is mechanically supported by the flexible member 400 such that the screen 402 lies along a plane 410 extending from the back 110 of the separator frame 102 toward the front 108 of the separator frame 102. In some examples, the screen 402 lies along a plane that is within a range of 5 degrees to –5 degrees of being parallel to the floor or a surface of the floor. This range of degrees from parallel can be viewed from a side of the separation device 100 extending from the front 108 to the back 110 of the separation frame 102. In some examples, the screen 402 lies along a plane that is parallel to the floor or a surface of a section of the floor.

The separator device 100 includes an actuator 600 mechanically attached to the screen 402. In some examples, the actuator 600 can be attached to a portion of the screen frame 408, and in some examples, the actuator 600 can be attached directly to the screen 402. The actuator 600 is configured to apply an oscillatory force to the screen 402. Because the screen 402 is mechanically supported by the flexible member 400, the oscillatory force applied to the screen 402 by the actuator 600 causes the screen 402 to oscillate relative to the separator frame 102. The oscillation of the screen 402 sifts the supported soiled animal bedding such that the supported animal bedding 124 is moved along the direction 404 from the back 110 of the separator frame 102 toward the front 108 of the separator frame 102. During the movement of the supported animal bedding 124, the animal bedding material 124 falls through the screen 402 while the clumped animal manure 126 moves toward the front 108 of the separator frame 102 until the clumped animal manure 126 falls off a front edge 414 of the screen 402.

Remaining with FIGS. 4, 5, and 6, in some examples, the actuator 600 is a high-frequency brushless direct current (DC) motor. The motor is mechanically attached to the screen 402 through structures and methods previously described. The motor can rotationally operate a rotating shaft that includes an eccentric weight. Attachment of the eccentric weight on the rotating shaft creates the oscillation and this arrangement is configured to apply an oscillatory force to the screen 402.

In some examples, the high-frequency brushless DC motor coupled with the eccentric weight is configured to impart to the screen 402 an oscillatory force of about 20 pounds at approximately 2,000 revolutions per minutes (e.g., a frequency of about 1,100 to about 1,700 oscillations per minute). In some examples, the oscillatory force frequency is about 1,200 to about 1,400 oscillations per minute. In further examples, the oscillatory force frequency is about 1,300 to about 1,500 oscillations per minute, or 20 to 15 Hertz (Hz). In some examples, the flexible member 400 is constructed of a fatigue-resistant stainless steel configured such that an oscillatory frequency of about 1,300 to about 1,500 vibrations per minute imparts a displacement of the flexible member 400 of about 0.10 inches to about 0.18 inches.

The separator device 100 can include a battery 602 attached to the separator frame 102. The battery 602 is in electrical communication with the actuator 600 to provide electrical power to the actuator 600. The electrical power is provided to operate the actuator 600 to provide the oscillatory force to the screen 402. In some examples, the battery 602 is a rechargeable battery. Use of a rechargeable battery can eliminate a need for an electrical outlet in close proximity to the animal stall and the maneuverability limitations of power cords and extension cords. In some examples, the battery 602 is a 3 amp-hour, rechargeable, 18-volt, direct current lithium-ion battery. In some examples, the battery 602 can be a larger-capacity or higher-voltage unit, such as a 24V or 36V lithium-ion battery, or an equivalent power source suitable to deliver extended run times or higher oscillation forces. This can enable more flexible operation across multiple stalls without requiring frequent battery changes or recharges The separator device 100 can include a speed control device 604 in electrical communication with the actuator 600 to selectively control an oscillation speed of the actuator 600. Selective control of the oscillation speed of the actuator 600 provides selective control of the oscillation speed of the screen 402. It is contemplated that the oscillation speed of the actuator 600 can be altered to provide optimal screen displacement distances and displacement forces for particular animal stall circumstances, for example: different animal bedding materials, different animal species, etc. A power switch 606 can be included in a control unit 608 with the battery 602 and the speed control device 604. The control unit 608 can be mounted to the separator device 100 proximate the back 110 of the separator frame 102.

During operation, the separator device 100 of generates an operating volume of about 55 dB. Relatively low volume levels such as 55 dB can be useful when operating equipment close to animals such as horses. Operating at a volume level that is relatively close to typical conversation volume levels enables separating device 100 use in close proximity to animals. The lower volume level can eliminate the time and effort required to remove the animal prior to stall cleaning and leading the animal back into the stall after cleaning.

The separator device 100 may include optional noise-dampening materials or vibration-isolating mounts. For instance, a resilient dampening pad may be placed between the actuator 600 and the screen frame 408, or along the cross bar 118, to reduce transmitted vibrations. Such features can help maintain operating noise at or below about 55 dB, improving the comfort and safety of both the worker and the animals.

Figure 7:
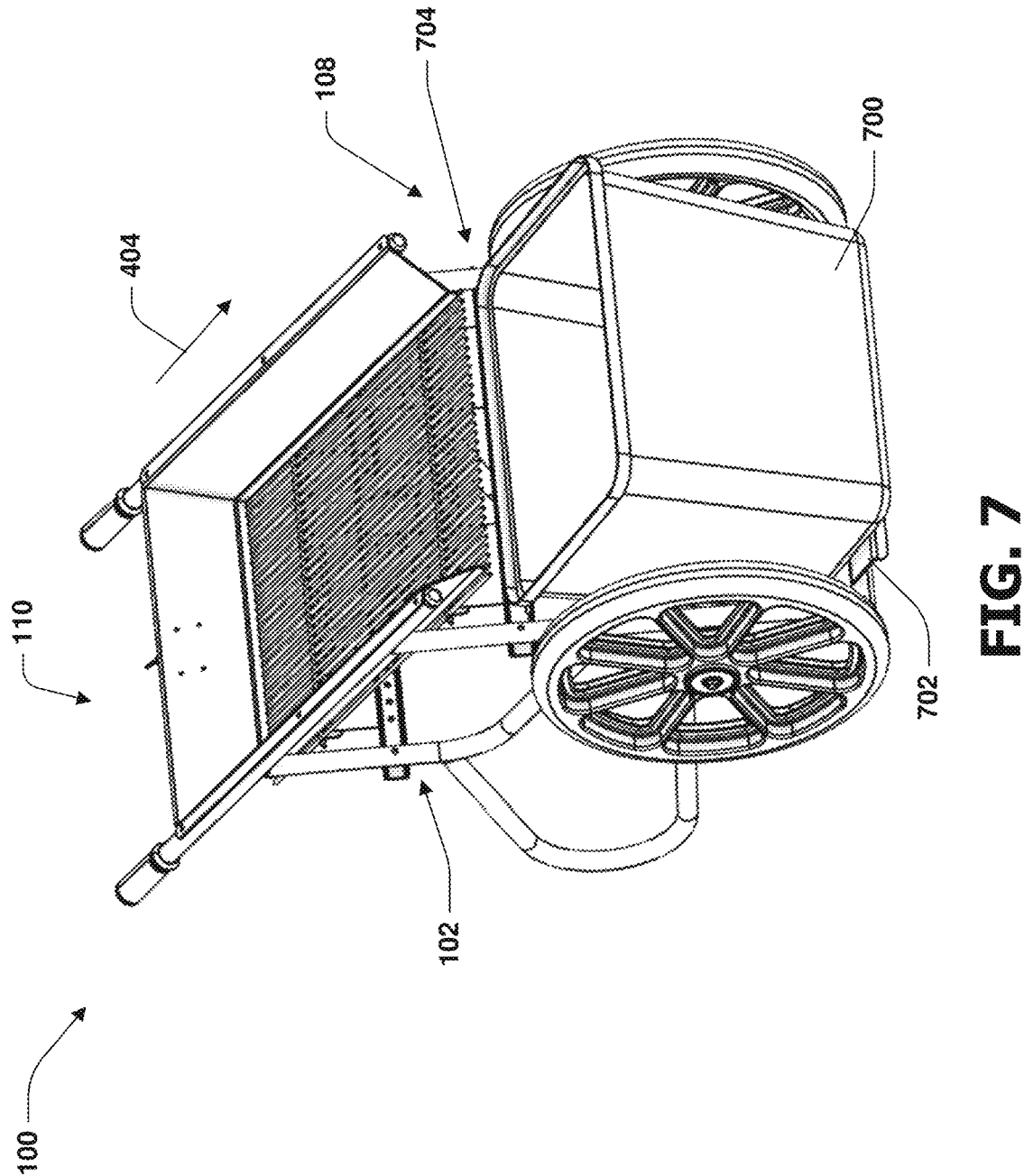
FIG. 7 is a perspective view of the separator device of FIG. 1 shown from a front, underside of the separator device.
Figure 8:
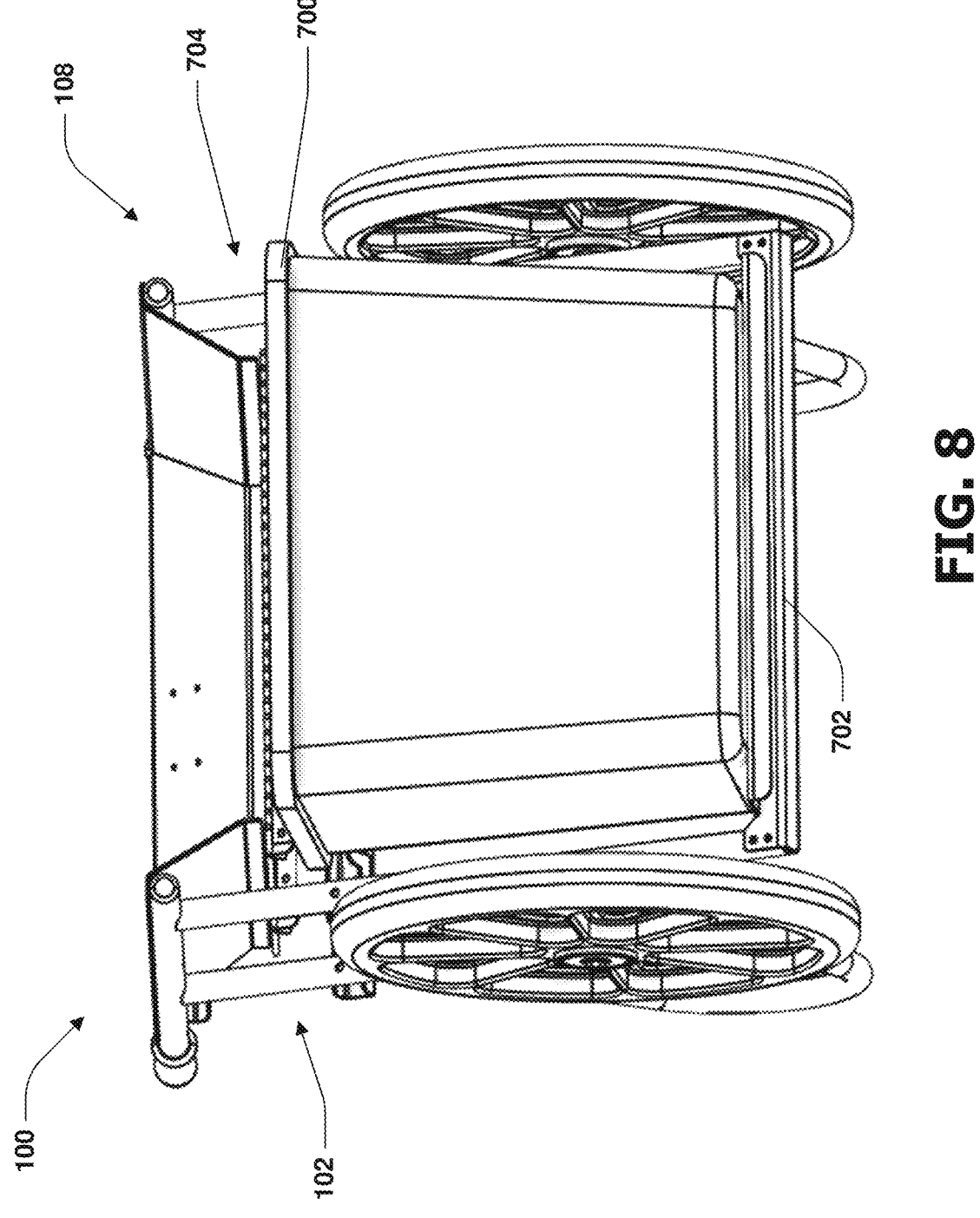
FIG. 8 is a perspective view of a front side of the separator device of FIG. 1.

Referring to FIGS. 7 and 8, perspective views of the separator device 100 are illustrated, showing a front underside (FIG. 7) and the front 108 side of the separator device 100. In some examples, the separator device 100 includes a container 700. The separator frame 102 additionally includes container support 702 and the container support 702 is configured to mechanically support the container 700. The container support 702 can be constructed of any suitable structures and materials. The container 700 can be releasably secured to the separator frame 102 and/or the container support 702 by suitable structures such as clips, stretch cords, hooks, etc. to provide relatively simple removal from the separator frame 102 for emptying and cleaning operations. The container 700 is appropriately located such that the clumped animal manure 126 falling off of the front edge 704 of the screen 402 is collected by the container 700 when the container 700 is supported by the container support 702.

Figure 9:
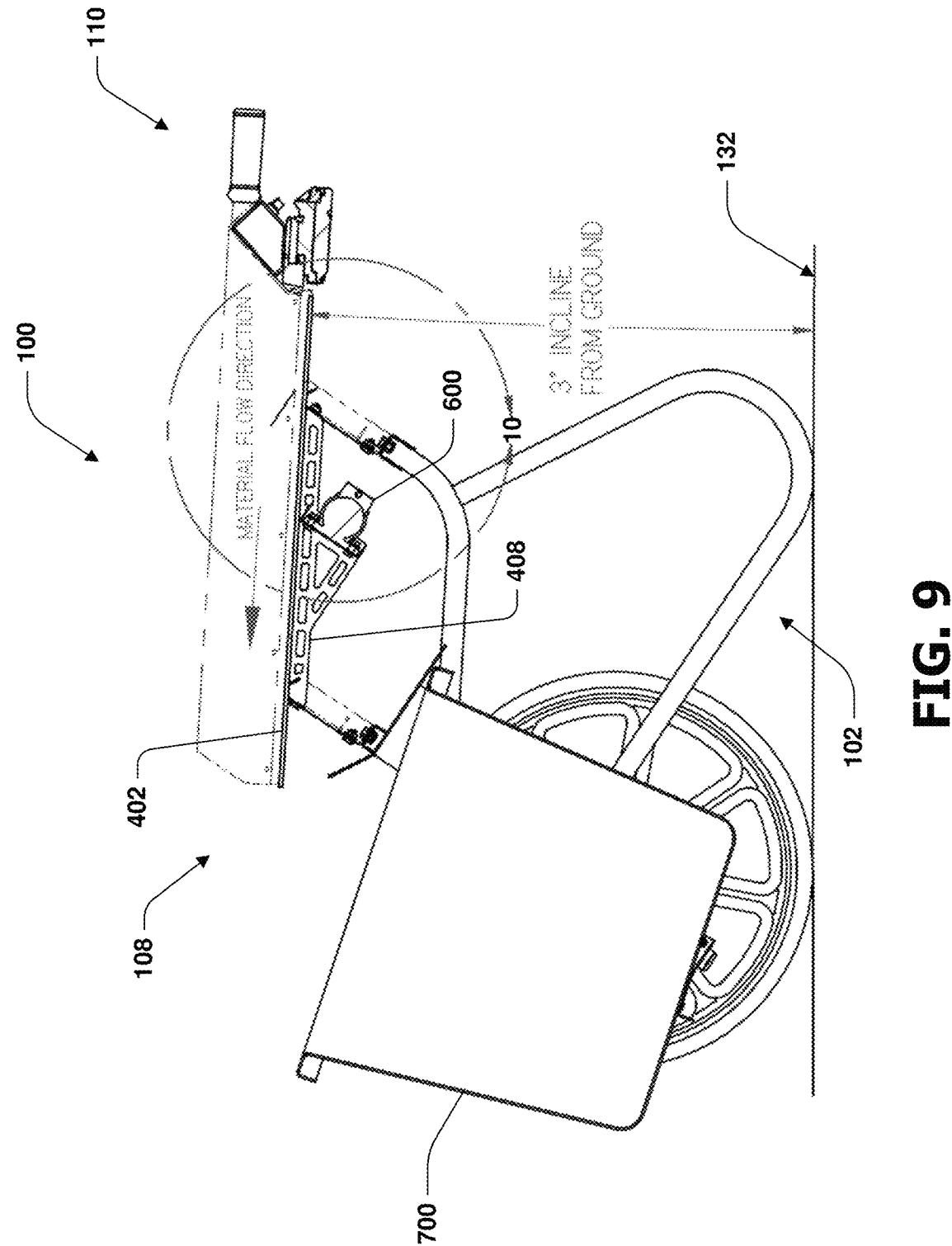
FIG. 9 is a cross-section view taken along a longitudinal centerline of an exemplary separator device.
Figure 10:
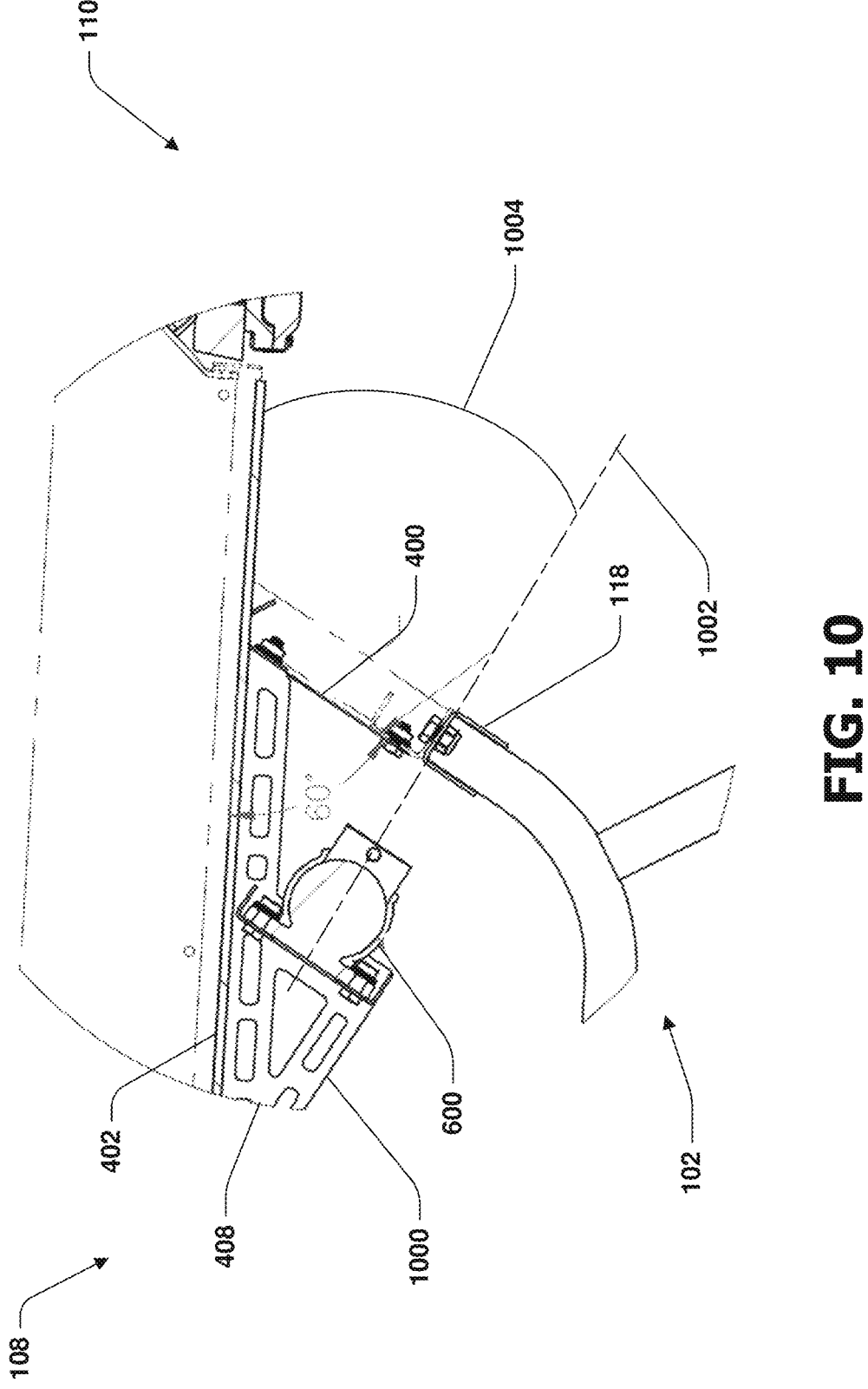
FIG. 10 is a detail view of an actuator and an actuator mount of the separator device of FIG. 9.

Referring to FIGS. 9 and 10, a cross-section view and a detail view taken along a longitudinal centerline of an exemplary separator device are illustrated. In some examples, as shown, the screen 402 can be oriented at an angle of about 3° from the floor 132 such that the clumped animal manure 126 moves toward the front 108 side of the separator device 100 at a slightly upward angle. In some examples, the screen frame 408 includes a mounting arrangement 1000 for the actuator 600 that is transverse to a plane defined by the screen 402.

In some examples, the actuator 600 can include a centerline 1002, and the actuator 600 is attached to the screen frame 408 such that the centerline 1002 is oriented at a downward angle 1004 with respect to the back 110 of the separator frame 102. In some examples, the angle 1004 can be between about 20° and about 40°. In further examples, the angle 1004 can be between about 25° and about 35°. In a particular example, the angle 1004 can be about 30°. Regardless of the angle, the angled mounting arrangement of the actuator 600 enables a portion of the vibratory forces developed by the actuator 600 to have a vertical component, not simply horizontal forces.

Orientation of the actuator 600 in this way tends to impart an upward force onto the screen 402 and thus the clumped animal manure 126 and the animal bedding material 124 at approximately a 30-degree upward angle (e.g., 30°+/−5°; or 30°+/−10°) relative to a surface of the screen 402. This upward force tends to impart a force on the clumped animal manure 126 and the animal bedding material 124 to urge the materials to "jump" across the screen 402. This jumping action enables the clumped animal manure 126 and the animal bedding material 124 to move even if the screen 402 is inclined toward the front 108, opposite the direction of the oscillating force imparted by the actuator 600.

The jumping action enables less dense materials (e.g., the animal bedding material 124) to advance more slowly "uphill" or toward the front 108 of the separator frame 102 when compared to denser materials (e.g., the clumped animal manure 126). As a result, the animal bedding material 124 spends more time on or above the screen 402 giving the animal bedding material 124 an increased frequency of separation from the clumped animal manure 126 and fall through the screen 402 onto the stall floor 132. This results in a more compact separator device 100, significantly reducing both a length of the screen 402, and a feed height compared to other known separator devices.

Figure 11:
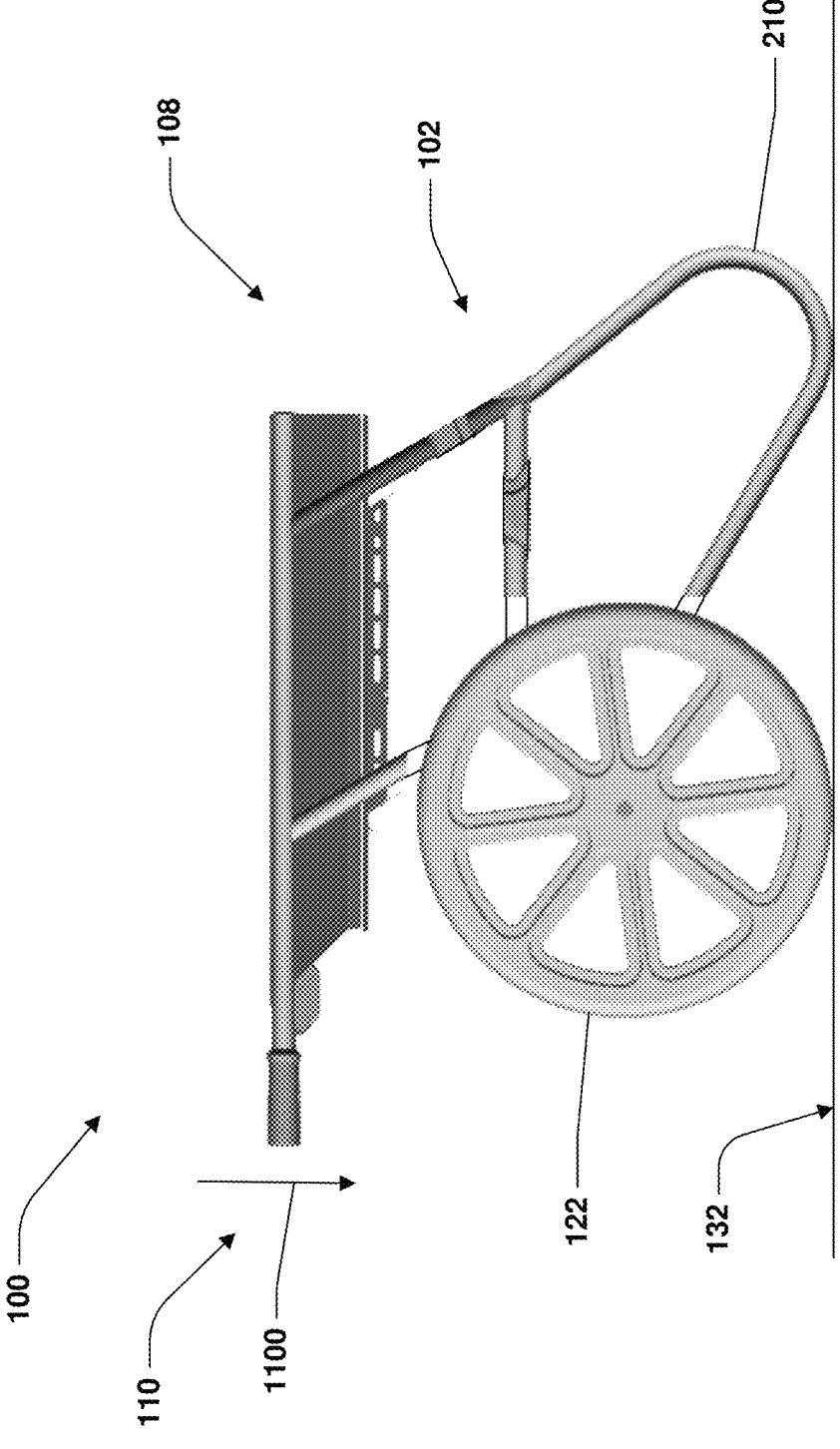
FIG. 11 is an elevation view of another embodiment of the separator device.

Referring to FIG. 11, a side elevation view of another embodiment of the separator device 100 is illustrated showing the at least one wheel 122 located between the stand 210 and the back 110 of the separator frame 102. In this arrangement, a downward force (represented by arrow 1100) is applied to the handles 120 to transition the separator device 100 from the stationary position to the ambulatory position.

Figure 12:
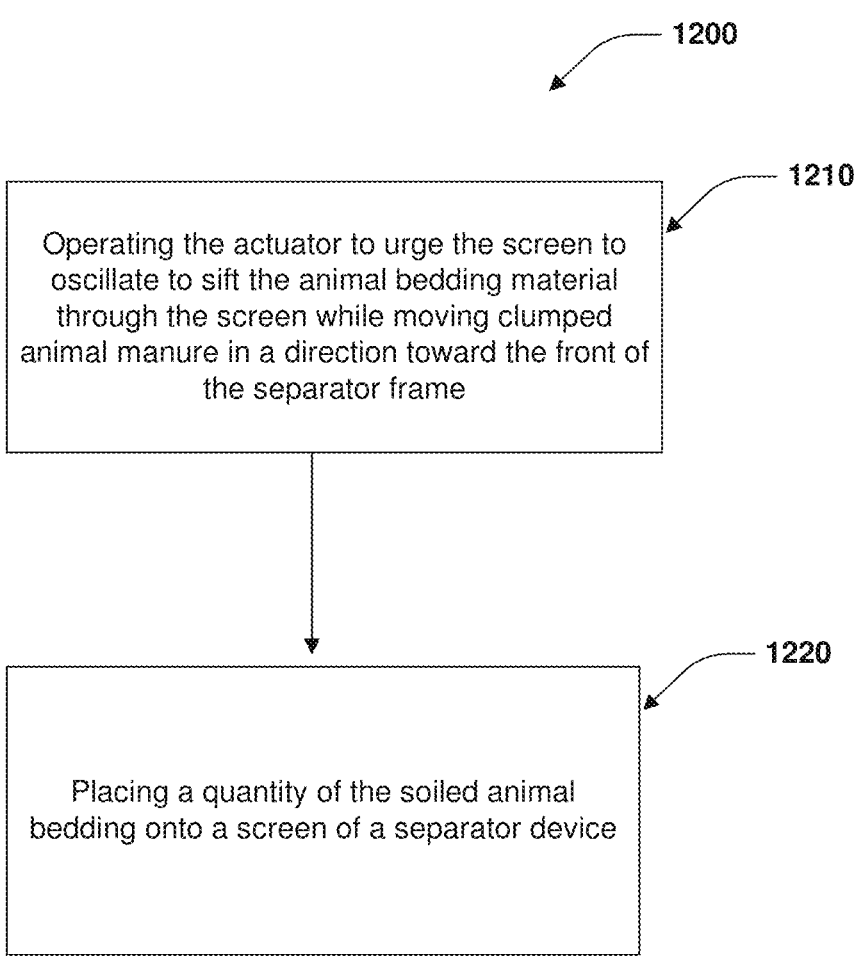
FIG. 12 is a flow chart representing steps in a method of using the separator device.

Referring to FIG. 12, a flow chart illustrates the steps of a method 1200 of using the separator device to sift soiled bedding material to separate the clumped animal manure from a quantity of bedding material. The method includes placing a quantity of the soiled animal bedding onto a screen of a separator device 1210. The separator device includes a separator frame including handles attached to a back of the separator frame. The separator also includes at least one wheel rotationally attached to the separator frame and a stand attached to the separator frame. A flexible member is attached to the separator frame and a screen is attached to the flexible member. The screen is configured to support the soiled animal bedding. An actuator is mechanically attached to the screen and configured to apply an oscillatory force to the screen. A container is supportable by a container support of the separator frame. Clumped animal manure falling off of a front edge of the screen is collected by the container when the container is supported by the container support.

The method also includes operating the actuator to urge the screen to oscillate 1220. The screen oscillation sifts the animal bedding material through the screen while moving clumped animal manure in a direction toward the front of the separator frame. The sifting and motion of the material to the front of the separator device separates the animal bedding material from the clumped animal manure.

The method can also include operating the actuator such that the actuator and the separator device operation produces less than 55 dB of sound volume. The method can also include operating the actuator at a rotational speed to impart to the screen an oscillatory force of about 20 pounds at a frequency of about 1,300 to about 1,500 oscillations per minute.

Figure 13:
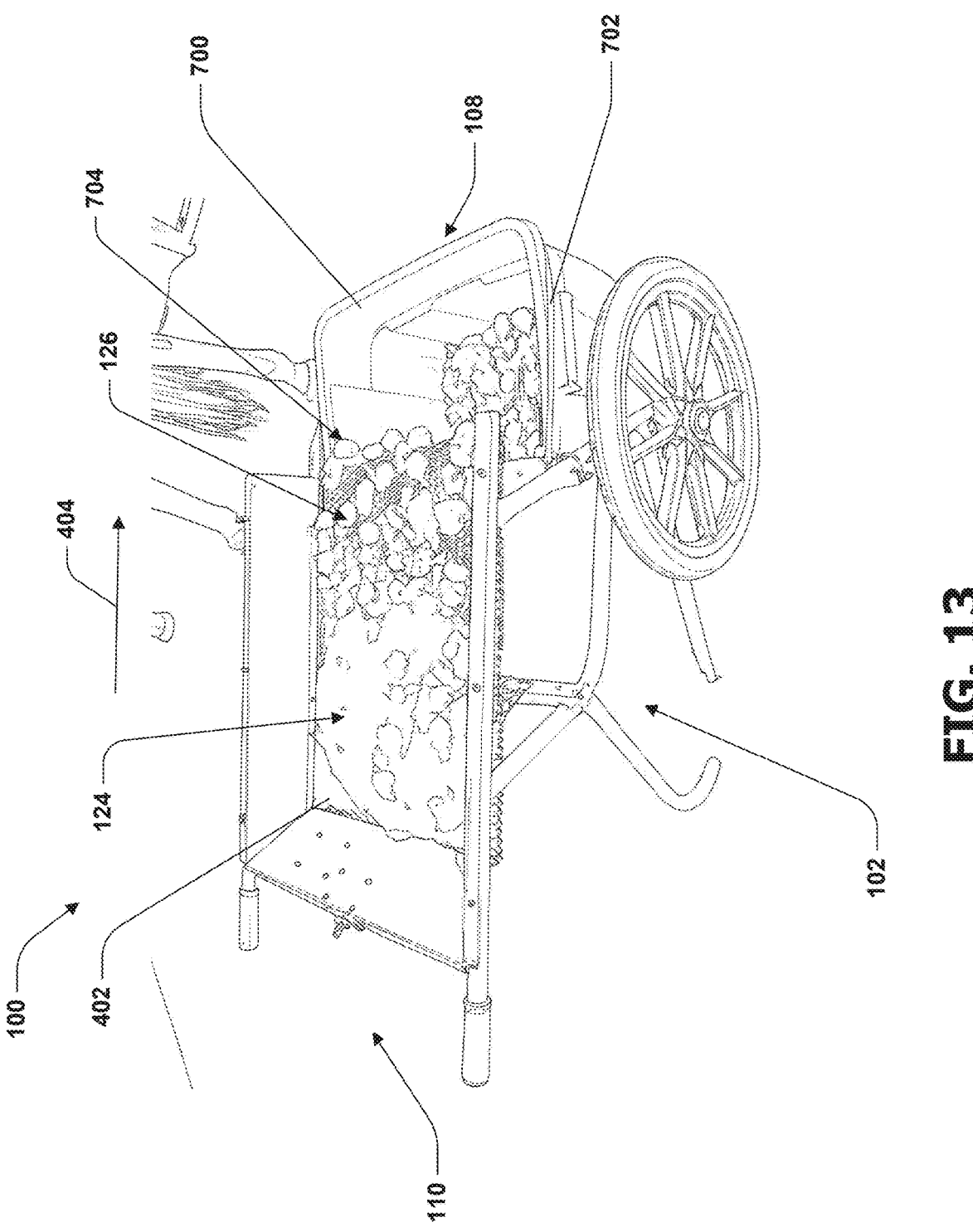
FIG. 13 is a perspective side view of the separator device showing the screen supporting the soiled animal bedding material.

Referring to FIG. 13, a perspective side view of the separator device 100 is illustrated showing the screen 402 supporting the soiled animal bedding material during operation of the described apparatus. The screen 402 is mechanically supported by the flexible member 400 such that the oscillatory force applied to the screen 402 by the actuator 600 causes the screen 402 to oscillate relative to the separator frame 102. The oscillation of the screen 402 sifts the supported soiled animal bedding, such that the supported animal bedding is moved along a direction 404 from the back 110 of the separator frame 102 towards the front 108 of the separator frame 102. During the movement of the supported animal bedding, the animal bedding material 124 falls through the screen 402 while the clumped animal manure 126 moves towards the front 108 of the separator frame 102 until the clumped animal manure 126 falls off a front edge 704 of the screen 402. The separator device 100 further includes a container 700 supportable by a container support 702 of the separator frame 102 such that the clumped animal manure 126 falling off of the front edge 704 of the screen 402 is collected by the container 700.

The disclosed apparatus and methods can provide several benefits. In some examples, the disclosed apparatus and methods can improve time efficiency for workers. For example, the apparatus and methods can reduce the time required to clean animal stalls, at least partly due to the disclosed automated sifting mechanism with a relatively high oscillation speed. This feature, combined with its small size and cordless operation, minimizes the need for multiple trips in and out of the stall.

Additionally, the described sifting action can promote a greater amount of animal bedding material (e.g., wood shavings) retained in the stall, reducing bedding material consumption. The disclosed apparatus and methods can also help eliminate at least one repetitive motion required by traditional sifting tools, thereby reducing strain on a worker (e.g., tennis elbow, back issues, etc.).

The present disclosure can also improve animal stall hygiene. The optimized screen perforation size or distance between rods of the screen can help ensure improved removal of clumped animal manure to make stalls cleaner and reduce the presence of flies.

The relatively low operating noise levels can be below that of a normal conversation (55 dB), making the device and methods suitable for use even with horses present in the stall being cleaned. Additionally, the wheelbarrow-like configuration of the apparatus can increase maneuverability within the stall.

The described apparatus and methods can be powered by a 20V battery, to help encourage continuous apparatus operation. In some examples, a single battery charge can last for approximately twenty-five stall cleanings.

The container can be formed as a flexible bag or liner rather than a rigid bin, which may be beneficial in stalls with limited space. To facilitate easy attachment and removal, the container support can include hooks, elastic cords, or clamp-like structures. This arrangement can reduce the likelihood of spillage when emptying the container, and it can accommodate different container sizes or shapes.

Although the apparatus and methods have been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure. In addition, while a particular feature of the disclosure may have been described above with respect to only one or more of several illustrated embodiments, such feature may be combined with one or more other features of the other embodiments, as may be desired and advantageous for any given or particular application.

The invention claimed is:

1. A separator device for sifting soiled animal bedding to separate animal bedding material from clumped animal manure, the separator device comprising:
   a separator frame including handles attached to the separator frame and located at a back of the separator frame;
   at least one wheel rotationally attached to the separator frame;
   a stand attached to the separator frame and configured to:
      engage with a floor when the separator frame is in a stationary position, such that the separator frame is positioned in an upright position when at rest;
      disengage with the floor when the separator frame is moved from the stationary position to an ambulatory position by applying a lifting force to the handles acting in a direction perpendicular to the floor, such that the separator device is movably supported by the at least one wheel;
   a flexible member attached to the separator frame;
   a screen attached to the flexible member and configured to support the soiled animal bedding;
   an actuator mechanically attached to the screen and configured to apply an oscillatory force to the screen, wherein:
      the screen is mechanically supported by the flexible member, such that:
         the screen lies along a plane extending from the back of the separator frame towards a front of the separator frame;
         the oscillatory force applied to the screen by the actuator causes the screen to oscillate relative to the separator frame;
      the oscillation of the screen sifts the supported soiled animal bedding, such that:
         the supported animal bedding is moved along a direction from the back of the separator frame towards the front of the separator frame; and
         during the movement of the supported animal bedding, the animal bedding material falls through the screen while the clumped animal manure moves towards the front of the separator frame until the clumped animal manure falls off a front edge of the screen; and a container supportable by a container support of the separator frame, such that the clumped animal manure falling off of the front edge of the screen is collected by the container when the container is supported by the container support;
   wherein the separator frame additionally includes the container support and the container support is configured to mechanically support the container.

2. The separator device of claim 1, wherein the stand is located between the at least one wheel and the back of the separator frame such that an upward force is applied to the handles to transition the separator device from the stationary position to the ambulatory position.

3. The separator device of claim 1, wherein the at least one wheel is located between the stand and the back of the separator frame such that a downward force is applied to the handles to transition the separator device from the stationary position to the ambulatory position.

4. The separator device of claim 1, comprising a screen assembly, the screen assembly including a screen frame located between the actuator and the screen and attached to both the actuator and the screen such that an oscillation of the actuator urges oscillation of the screen frame to urge oscillation of the screen.

5. The separator device of claim 1, wherein the separator frame comprises a sidewall located above the screen to at least partially define a hopper volume above the screen to contain a quantity of the soiled animal bedding and the clumped animal manure prior to separation of the clumped animal manure from the animal bedding.

6. The separator device of claim 5, wherein the sidewall is oriented at an angle relative to the direction perpendicular to the floor such that the hopper volume has a first cross-sectional area at a first distance above the screen and a second cross-sectional area at a second distance above the screen, the first cross-sectional area greater than the second cross-sectional area.

7. The separator device of claim 1, wherein the actuator comprises a high-frequency brushless direct current motor mechanically attached to the screen and an eccentric weight on a rotating shaft configured to apply an oscillatory force to the screen.

8. The separator device of claim 7, wherein the high-frequency brushless direct current motor coupled with the eccentric weight is configured to impart to the screen an oscillatory force of about 20 pounds at a frequency of about 1,300 to about 1,500 oscillations per minute.

9. The separator device of claim 1, wherein the flexible member comprises a fatigue-resistant stainless steel configured such that an oscillatory frequency of about 1,300 to about 1,500 vibrations per minute imparts a displacement of the flexible member of about 0.10 inches to about 0.18 inches.

10. The separator device of claim 1, comprising a rechargeable battery attached to the separator frame, the rechargeable battery in electrical communication with the actuator to provide electrical power to the actuator.

11. The separator device of claim 10, wherein the rechargeable battery comprises a 3 amp-hour, rechargeable, 18-volt, direct current lithium-ion battery.

12. The separator device of claim 1, comprising a speed control device in electrical communication with the actuator to selectively control an oscillation speed of the screen.

13. The separator device of claim 1, wherein the actuator is configured to apply the oscillatory force to the screen in a direction transverse to a plane defined by the screen such that the oscillatory force includes a force component in a vertical direction.

14. The separator device of claim 1, wherein the screen comprises rods extending in a direction parallel with a direction extending from the first end to the second end, the rods positioned with an open space between each rod of 0.2 to 0.5 inches.

15. The separator device of claim 1, wherein an outside diameter of the wheel is about 75% to about 85% of a distance measured from a top of the separator frame to the floor.

16. The separator device of claim 1, wherein the operating volume of the separator device is about 55 dB.

17. A separator device for sifting soiled animal bedding to separate animal bedding material from clumped animal manure, the separator device comprising:
　a separator frame including handles attached to the separator frame and located at a back of the separator frame;
　at least one wheel rotationally attached to the separator frame;
　a stand attached to the separator frame and configured to:
　　engage with a floor when the separator frame is in a stationary position, such that the separator frame is positioned in an upright position when at rest;
　　disengage with the floor when the separator frame is moved from the stationary position to an ambulatory position by applying a lifting force to the handles acting in a direction perpendicular to the floor, such that the separator device is movably supported by the at least one wheel;
　a flexible member attached to the separator frame;
　a screen attached to the flexible member and configured to support the soiled animal bedding;
　a sidewall attached to the separator frame to at least partially define a hopper volume above the screen to contain a quantity of the soiled animal bedding and the clumped animal manure;

an actuator mechanically attached to the screen, the actuator including an eccentric weight attached to a rotating shaft of the actuator configured to apply an oscillatory force to the screen;
　a battery attached to the separator frame and in electrical communication with the actuator to provide electrical power to the actuator;
　a speed control device in electrical communication with the actuator to selectively control a rotational rate of the actuator to control an oscillation speed of the screen, wherein:
　　the screen is mechanically supported by the flexible member, such that:
　　　the screen lies along a plane extending from the back of the separator frame towards a front of the separator frame;
　　　the oscillatory force applied to the screen by the motor causes the screen to oscillate relative to the separator frame;
　　the oscillation of the screen sifts the supported soiled animal bedding, such that:
　　　the supported animal bedding is moved along a direction from the back of the separator frame towards the front of the separator frame; and
　　　during the movement of the supported animal bedding, the animal bedding material falls through the screen while the clumped animal manure moves towards the front of the separator frame until the clumped animal manure falls off a front edge of the screen; and a container supportable by a container support of the separator frame, such that the clumped animal manure falling off of the front edge of the screen is collected by the container when the container is supported by the container support;
　wherein the separator frame additionally includes the container support and the container support is configured to mechanically support the container.

18. A method of operating a separator device for sifting soiled animal bedding to separate animal bedding material from clumped animal manure comprising:
　placing a quantity of the soiled animal bedding onto a screen of a separator device, the separator device comprising:
　　a separator frame including handles attached to the separator frame and located at a back of the separator frame;
　　at least one wheel rotationally attached to the separator frame;
　　a stand attached to the separator frame;
　　a flexible member attached to the separator frame;
　　a screen attached to the flexible member and configured to support the soiled animal bedding;
　　an actuator mechanically attached to the screen and configured to apply an oscillatory force to the screen; and
　　a container supportable by a container support of the separator frame, such that the clumped animal manure falling off of a front edge of the screen is collected by the container when the container is supported by the container support; and
　operating the actuator to urge the screen to oscillate to sift the animal bedding material through the screen while moving clumped animal manure in a direction toward the front of the separator frame to separate the animal bedding material from the clumped animal manure.

19. The method of claim 18, wherein operating the actuator produces less than 55 dB of sound volume.

20. The method of claim 18, wherein operating the actuator includes operating the actuator at a rotational speed to impart to the screen an oscillatory force of about 20 pounds at a frequency of about 1,300 to about 1,500 oscillations per minute.

* * * * *